United States Patent
Liao et al.

(10) Patent No.: US 8,279,598 B2
(45) Date of Patent: Oct. 2, 2012

(54) ELECTRONIC DEVICE AND SEMI-AUTO SLIDING MECHANISM THEREOF

(75) Inventors: Yu-Jing Liao, Taoyuan County (TW); Ying-Hao Yeh, Taoyuan County (TW); Ying-Yen Cheng, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 358 days.

(21) Appl. No.: 12/692,008

(22) Filed: Jan. 22, 2010

(65) Prior Publication Data

US 2011/0007458 A1 Jan. 13, 2011

(30) Foreign Application Priority Data

Jul. 9, 2009 (TW) .............................. 98123182 A

(51) Int. Cl.
*G06F 1/16* (2006.01)
(52) U.S. Cl. ............ 361/679.55; 361/679.3; 361/679.56; 455/575.1; 455/575.4; 379/438.01; 379/433.11; 379/433.12
(58) Field of Classification Search .............. 361/679.55
See application file for complete search history.

(56) References Cited

U.S. PATENT DOCUMENTS

| 7,564,967 | B2 * | 7/2009 | Pan ........................... 379/433.12 |
| 7,729,730 | B2 * | 6/2010 | Zuo et al. .................... 455/575.1 |
| 7,869,207 | B2 * | 1/2011 | Zhang et al. ............. 361/679.55 |
| 2006/0205451 | A1 * | 9/2006 | Pan ............................. 455/575.4 |
| 2009/0093285 | A1 | 4/2009 | Weng et al. |

FOREIGN PATENT DOCUMENTS

| CN | 101248585 A | 8/2008 |
| EP | 1075125 A2 | 2/2001 |
| TW | 557050 | 10/2003 |
| TW | M304171 | 1/2007 |
| TW | 200915959 | 4/2009 |
| WO | WO-2007/035008 A1 | 3/2007 |

* cited by examiner

*Primary Examiner* — Anthony Q Edwards
(74) *Attorney, Agent, or Firm* — Birch, Stewart, Kolasch & Birch, LLP

(57) ABSTRACT

A semi-auto sliding mechanism is provided, including a first member, a second member, a first rack, a second rack, a pinion gear pivotally connected to the second member, and a clockwork spring connecting the pinion gear to the second member. The first and second racks are disposed on the first member. When the first member is moved relative to the second member to a first position by an external force, the pinion gear rolls along the first rack, and an elastic potential energy is stored in the clockwork spring. When the external force is released, the clockwork spring impels the pinion gear to rotate along the second rack, such that the first member moves relative to the second member from the first position to a second position.

11 Claims, 7 Drawing Sheets

ELECTRONIC DEVICE AND SEMI-AUTO SLIDING MECHANISM THEREOF

CROSS REFERENCE TO RELATED APPLICATIONS

This Application claims priority of Taiwan Patent Application No. 098123182, filed on Jul. 9, 2009, the entirety of which is incorporated by reference herein.

BACKGROUND OF THE INVENTION

1. Field of the Invention

This application relates in general to an electronic device and in particular to an electronic device having a semi-auto sliding mechanism.

2. Description of the Related Art

FIG. 1 depicts a conventional sliding-type electronic device, such as a mobile phone or PDA, including an input module 100 and a display module 200 reciprocally movable with respect to each other (as the arrows indicate in FIG. 1), wherein the input module 100 includes a keypad 300, and the display module 200 includes a screen 400.

The input module 100 and the display module 200 are usually connected via a sliding hinge to facilitate semi-auto sliding therebetween. As the sliding hinge has considerable dimensions, miniaturization of the electronic device is not easy to achieve.

BRIEF SUMMARY OF INVENTION

The application provides a semi-auto sliding mechanism including a first member, a second member, a first rack, a second rack, a pinion gear pivotally connected to the second member, and a clockwork spring connecting the pinion gear to the second member. The first and second racks are disposed on the first member. When the first member is moved relative to the second member to a first position by an external force, the pinion gear rolls along the first rack, and an elastic potential energy is stored in the clockwork spring. When the external force is released, the clockwork spring impels the pinion gear to rotate along the second rack, such that the first member moves relative to the second member from the first position to a second position.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 1:
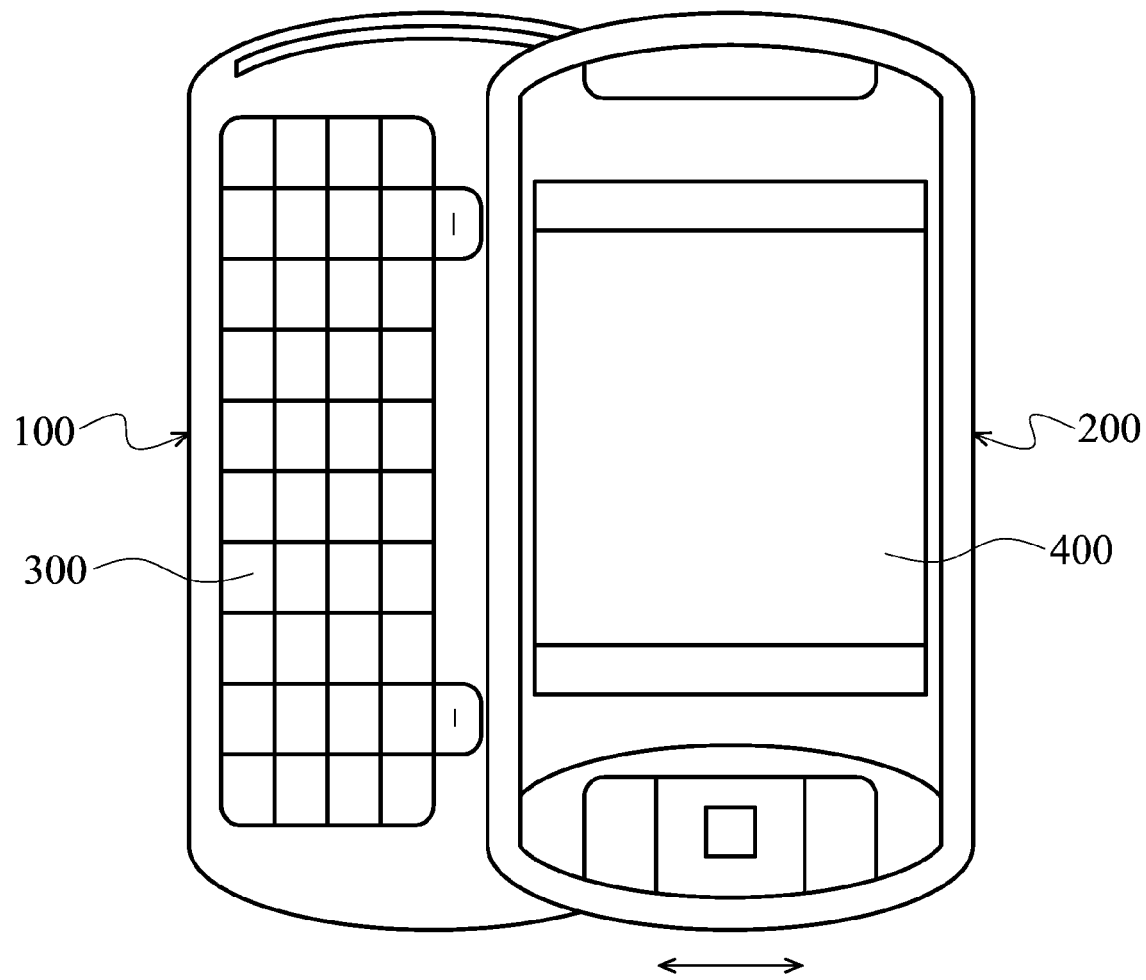
FIG. 1 is a perspective diagram of a conventional sliding-type electronic device.
Figure 2:
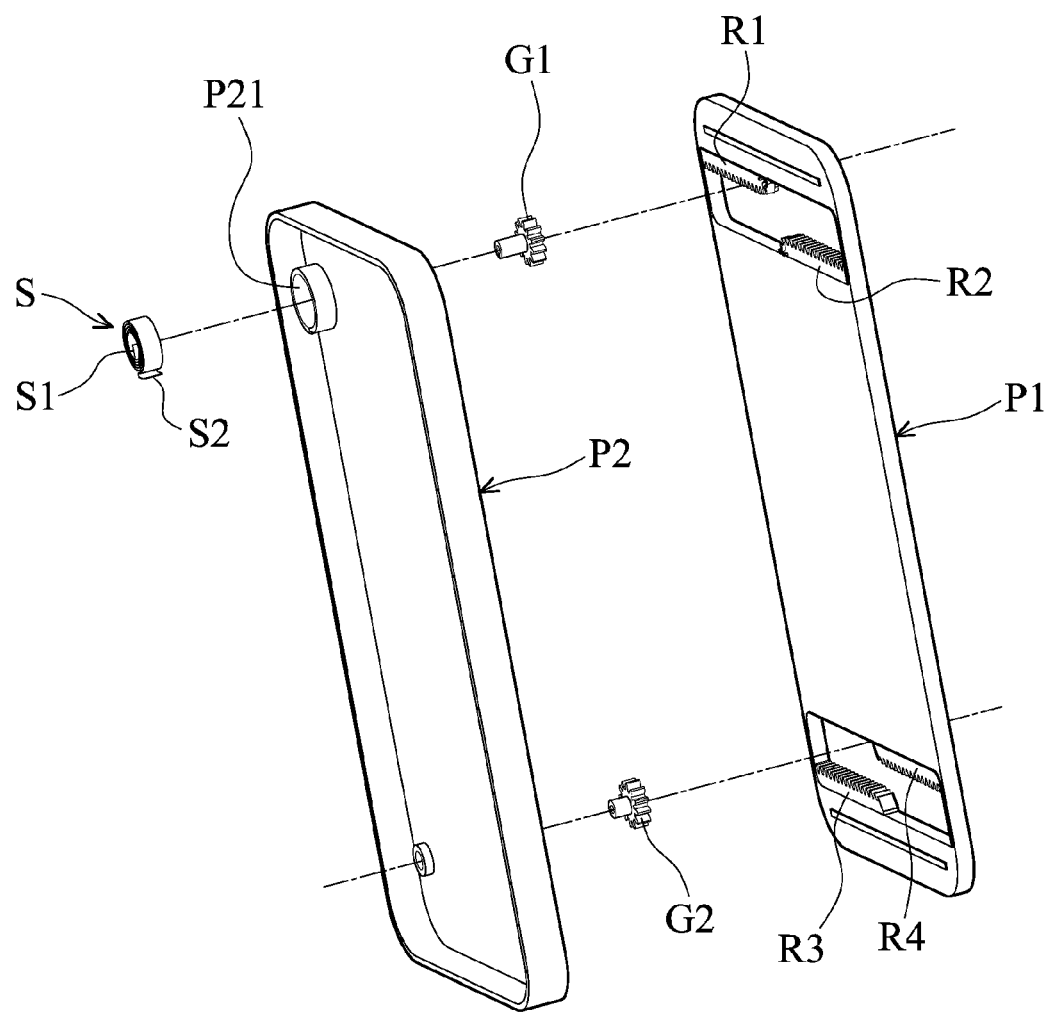
FIG. 2 is an exploded diagram of a semi-auto sliding mechanism according to an embodiment of the invention.

Referring to FIG. 2, an embodiment of a semi-auto sliding mechanism is disposed in an electronic device for connecting an input module and a display module thereof, such as the input module 100 and the display module 200 shown in FIG. 1. The semi-auto sliding mechanism primarily includes a first member P1, a second member P2, a first rack R1, a second rack R2, a pinion gear G1, and a clockwork spring S. In FIG. 2, the first and second racks R1 and R2 are mounted on the first member P1. The pinion gear G1 is pivotally connected to the second member P2 and can be rolled on the first rack R1 or the second rack R2. In this embodiment, the first and second racks R1 and R2 are parallel to each other and disposed on opposite sides of the pinion gear G1 for stably guiding the first member P1 to move relative to the second member P2. Similarly, a third rack R3, a fourth rack R4, and a pinion gear G2 corresponding to the first and second racks R1, R2 and the pinion gear G1 are disposed on the first and second members P1 and P2 so as to improve stability of the sliding mechanism.

The clockwork spring S in FIG. 2 is received in a recess P21 of the second member P2. A first end S1 of the clockwork spring S is fixed to the pinion gear G1, and a second end S2 of the clockwork spring S is fixed to a sidewall of the recess P21. When the pinion gear G1 rotates in a specific direction, the clockwork spring S is twisted with an elastic potential energy stored therein. The elastic potential energy can be released to facilitate semi-auto sliding between the first and second members P1 and P2.

Figures 3A, 3B:
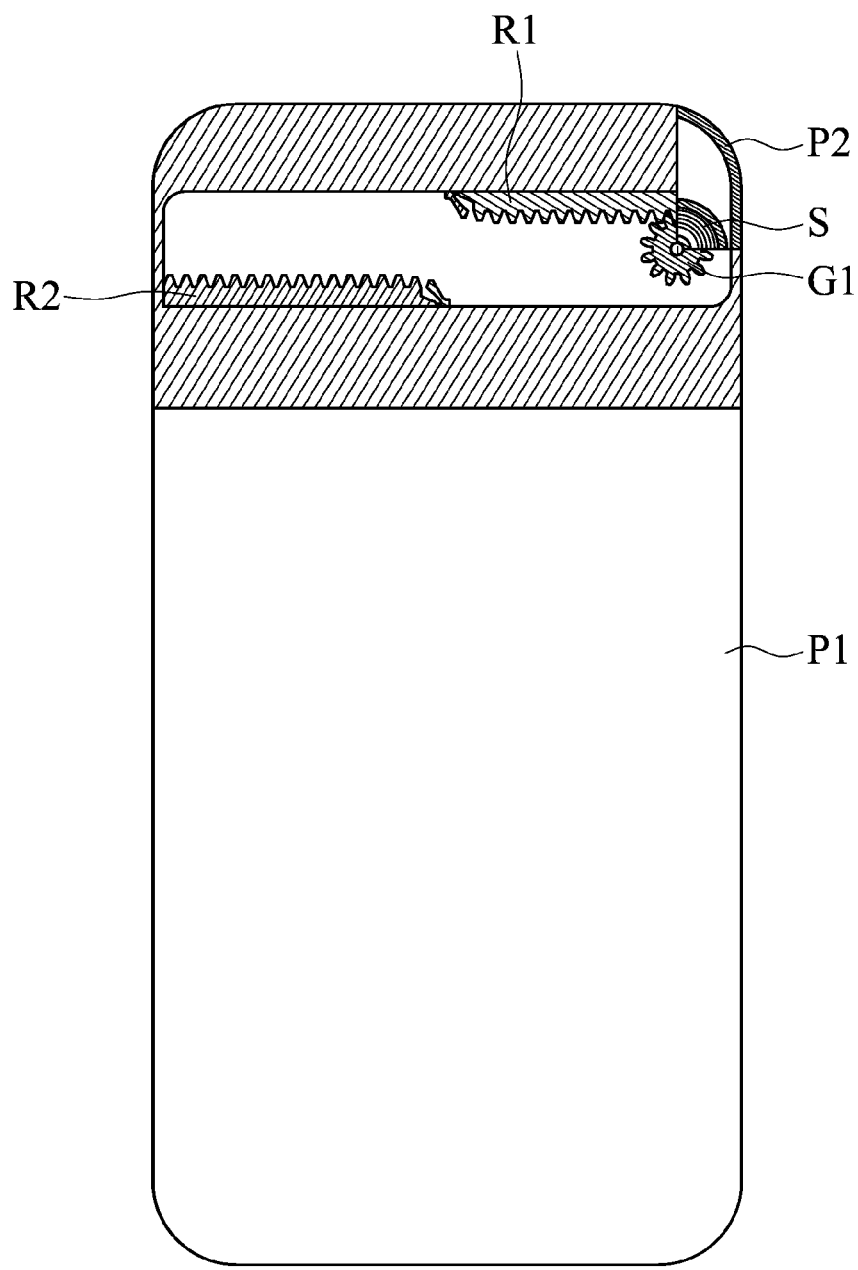
FIGS. 3A and 3B are perspective diagrams showing a first member in an initial position with respect to a second member according to an embodiment of the invention.
Figure 4A:
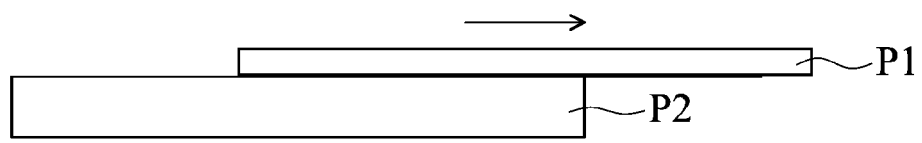
FIGS. 4A and 4B are perspective diagrams showing a first member in an first position with respect to a second member according to an embodiment of the invention.
Figure 4B:
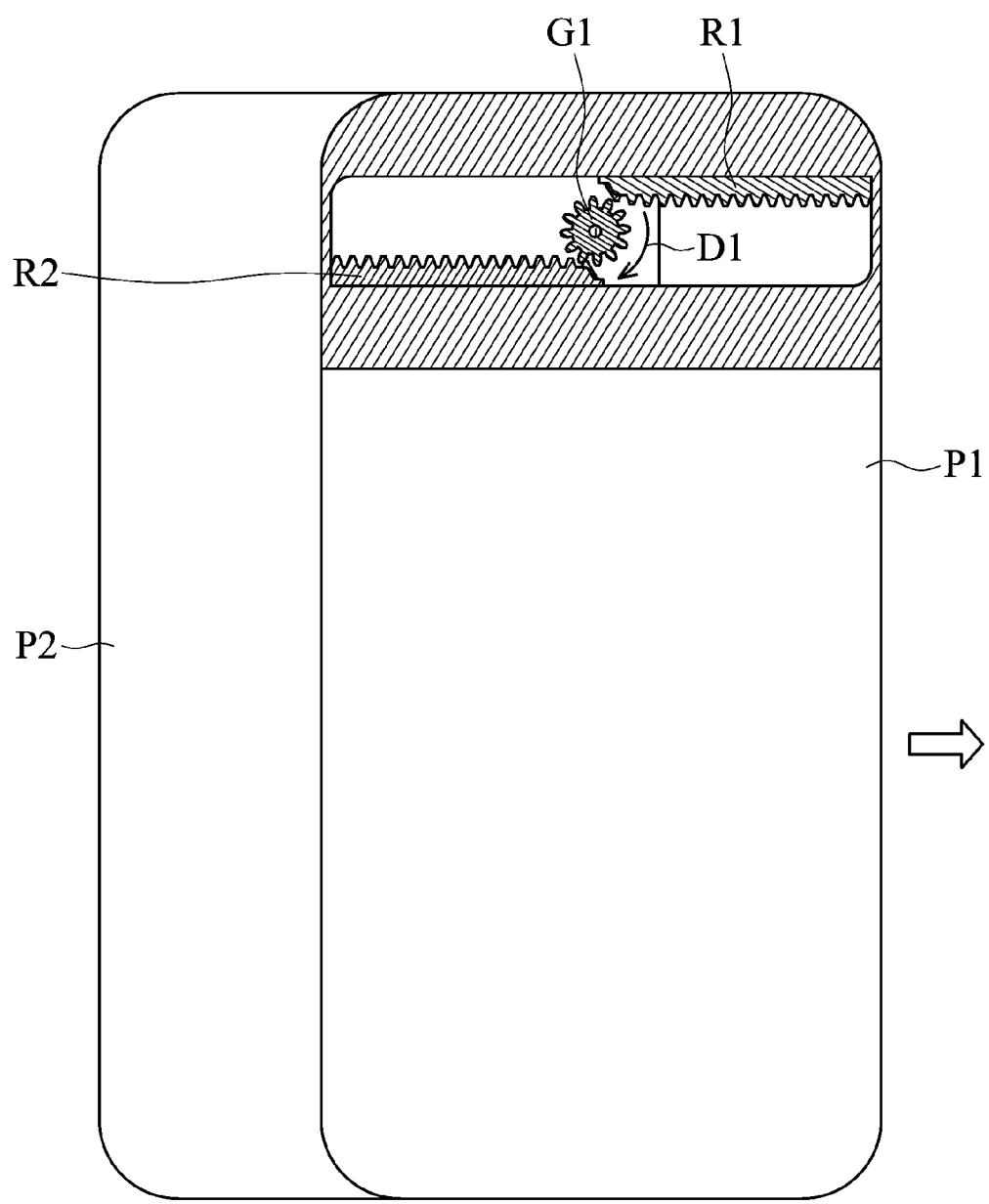

Referring to FIGS. 3A and 3B, when the first member P1 is in a initial position with respect to the second member P2, the first and second members P1 and P2 overlap and are in a closed state. Here, the pinion gear G1 is movably engaged with the first rack R1 and separated from the second rack R2, as shown in FIG. 3B. Referring to FIGS. 4A and 4B, when the first member P1 is pushed by an external force from the initial position to a first position, the pinion gear G1 is rotated in a first direction D1 by linear motion of the first rack R1, and the clockwork spring S is twisted with an elastic potential energy stored therein.

Figure 4C:
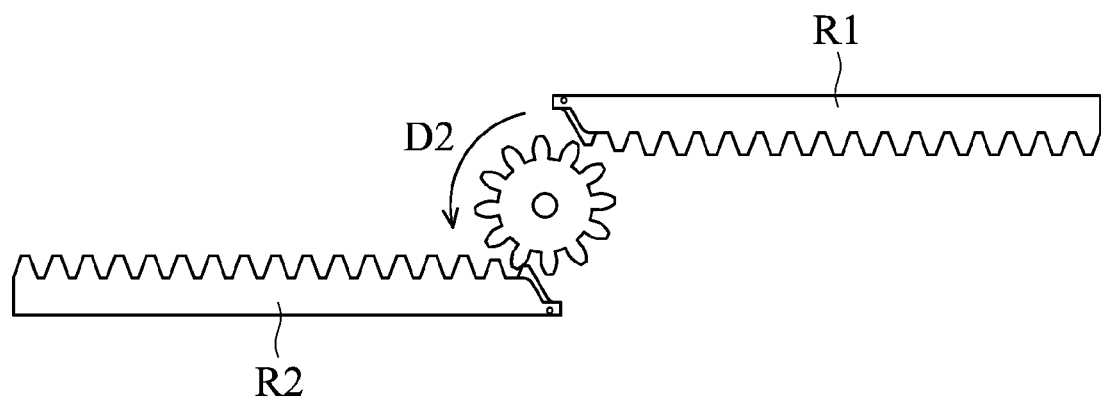
FIG. 4C is a perspective diagram showing a pinion gear rotating in a second direction and rolling along a second rack according to an embodiment of the invention.
Figure 5A:
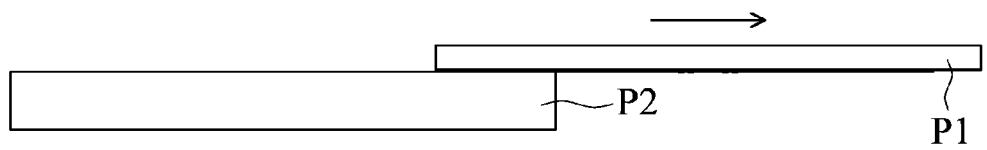
FIGS. 5A and 5B are perspective diagrams showing a first member in second position with respect to a second member according to an embodiment of the invention.
Figure 5B:
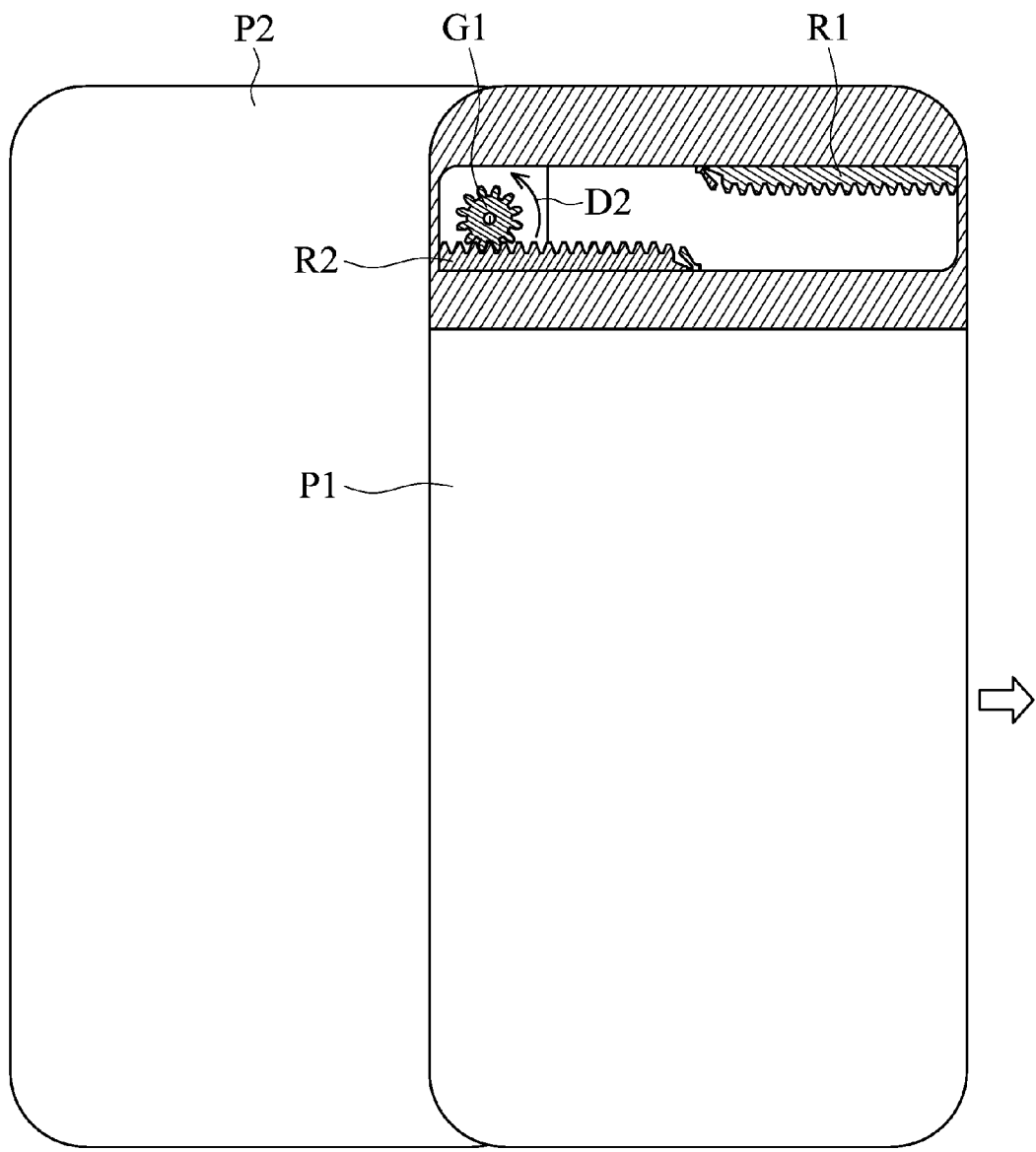

Specifically, when the first member P1 moves to the first position, the pinion gear G1 separates from the first rack R1 and engages with the second rack R2 on the side opposite to the first rack R1. When the external force is released, the clockwork spring S releases the elastic potential energy to rotate the pinion gear G1 in a second direction D2, opposite to the first direction D1, as shown in FIG. 4C. Since the pinion gear G1 is separated from the first rack R1 and engaged with the second rack R2, the first member P1 can be moved relative to the second member P2 to a second position by rotation of the pinion gear G1 in the second direction, as shown in FIGS. 5A and 5B.

Figure 6:
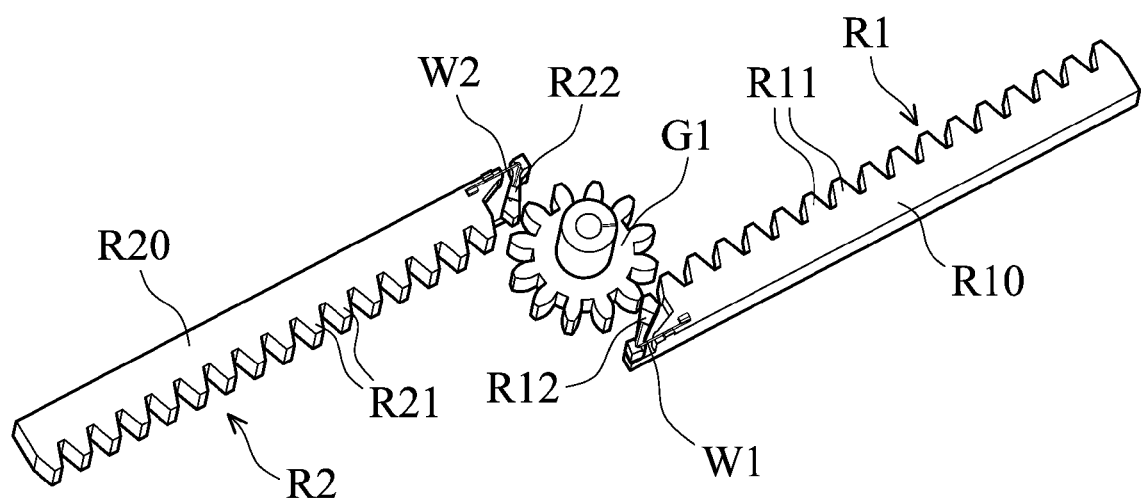
FIG. 6 is a perspective diagram of a pinion gear, a first rack, and a second rack according to an embodiment of the invention.

Referring to FIG. 6, the first rack R1 in this embodiment comprises a first main body R10 and a first one-way ratchet R12 disposed at an end of the first rack R1. The first main body R10 has a plurality of first linear teethed portions R11, and a first coil spring W1 movably connects the first main body R10 with the first one-way ratchet R12. Similarly, as shown in FIG. 6, the second rack R2 comprises a second main body R20 and a second one-way ratchet R22 disposed at an end of the second rack R2. The second main body R20 has a plurality of second linear teethed portions R21, and a second coil spring W2 movably connects the second main body R20 with the second one-way ratchet R22. In this embodiment, the first and second one-way ratchets R12 and R22 are respectively disposed at the end of the first and second racks R1 and R2 for preventing idle rotation of the pinion gear G1 and facilitating stable transition thereof between the first and second racks R1 and R2.

The invention provides a semi-auto sliding mechanism of a sliding-type electronic device. In some embodiments, the first member P1 can be selectively mounted on the input module 100 or the display module 200 of FIG. 1 with the second member P2 mounted respectfully on the display module 200 or input module 100, so that the input module 100 and the display module 200 are reciprocally movable with respect to each other. Since the clockwork spring is applied for driving the sliding mechanism, the invention can facilitate miniaturization and easier assembly, when compared to conventional sliding mechanisms. Furthermore, the invention applies at least two racks and a pinion gear movably engaged therewith, thus improving stability of the semi-auto sliding mechanism.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A semi-auto sliding mechanism, including:
   a first member;
   a second member, movable with respect to the first member and forming a recess;
   a first rack, disposed on the first member;
   a second rack, disposed on the first member;
   a pinion gear, pivotally connected to the second member and movably engaged with the first and second racks; and
   a clockwork spring, received in the recess and connecting the pinion gear with the second member, wherein when the first member is moved relative to the second member by an external force from an initial position to a first position, the pinion gear rotates in a first direction and rolls along the first rack,
   wherein when the pinion gear is in the first position with the external force being released, the clockwork spring impels the pinion gear to rotate in a second direction opposite to the first direction and to roll along the second rack so as to impel the first member from the first position to a second position relative to the second member
   wherein the first rack comprises a first main body, a first one-way ratchet disposed at an end of the first rack, and a first coil spring movably connecting the first main body with the first one-way ratchet.

2. The semi-auto sliding mechanism as claimed in claim 1, wherein the first and second racks are disposed on opposite sides of the pinion gear and are parallel to each other.

3. The semi-auto sliding mechanism as claimed in claim 1, wherein the first position is between the initial position and the second position.

4. The semi-auto sliding mechanism as claimed in claim 1, wherein when the first member is in the initial position with respect to the second member, the pinion gear is engaged with the first rack and separated from the second rack.

5. The semi-auto sliding mechanism as claimed in claim 1, wherein when the first member is in the first position with respect to the second member, the pinion gear is engaged with the second rack and separated from the first rack.

6. The semi-auto sliding mechanism as claimed in claim 1, wherein the clockwork spring has a first end fixed to the pinion gear and a second end fixed to the second member.

7. The semi-auto sliding mechanism as claimed in claim 1, wherein an elastic potential energy is stored in the clockwork spring when the pinion gear rotates in the first direction.

8. The semi-auto sliding mechanism as claimed in claim 7, wherein the elastic potential energy is released from the clockwork spring when the pinion gear rotates in the second direction.

9. The semi-auto sliding mechanism as claimed in claim 1, wherein the second rack comprises a second main body, a second one-way ratchet disposed at an end of the second rack, and a second coil spring movably connecting the second main body with the second one-way ratchet.

10. An electronic device capable of semi-auto sliding, including:
    an input module;
    a display module, movable with respect to the input module; and
    a semi-auto sliding mechanism as claimed in claim 1, wherein the first member is fixed to the input module and the second member is fixed to the display module.

11. An electronic device capable of semi-auto sliding, including:
    an input module;
    a display module, movable with respect to the input module; and
    a semi-auto sliding mechanism as claimed in claim 1, wherein the first member is fixed to the display module and the second member is fixed to the input module.

* * * * *